United States Patent [19]

Bayha et al.

[11] 3,714,258

[45] Jan. 30, 1973

[54] DIALKYLATED DIARYLAMINES AND A METHOD FOR PRODUCING SAME

[75] Inventors: Charles Edward Bayha, Monroe; Thomas Raymond Madden, Ringwood, both of N.J.

[73] Assignee: Reichhold Chemicals, Inc., White Plains, N.Y.

[22] Filed: Aug. 28, 1970

[21] Appl. No.: 67,891

[52] U.S. Cl. ................................................260/576
[51] Int. Cl. .............................................C07c 87/54
[58] Field of Search......................................260/576

[56] References Cited

UNITED STATES PATENTS

| | | | |
|---|---|---|---|
| 2,776,994 | 1/1957 | Wolfe et al. | 260/576 |
| 2,943,112 | 6/1960 | Popoff et al. | 260/576 |
| 3,496,230 | 2/1970 | Kaplan | 260/576 |

OTHER PUBLICATIONS

Groggins, Unit Processes in Organic Synthesis, 5th Ed., McGraw-Hill Book Co., Inc.: New York, 1958, pages 823–825.

*Primary Examiner*—Lewis Gotts
*Assistant Examiner*—C. F. Warren
*Attorney*—Munson H. Lane and Munson H. Lane, Jr.

[57] ABSTRACT

A solid dialkylated diarylamine useful as an antioxidant for rubbery materials and other systems subject to degradation and method of producing the same. The improved method of production consists of reacting (A) an olefin and (B) a diarylamine in the presence of a Friedel-Crafts catalyst under an inert atmosphere at ambient pressures and a temperature ranging from about 120°–140°C., said olefin being introduced below the surface of said diarylamine (B). This method affords a high yield and reduces undesirable by-products.

13 Claims, 1 Drawing Figure

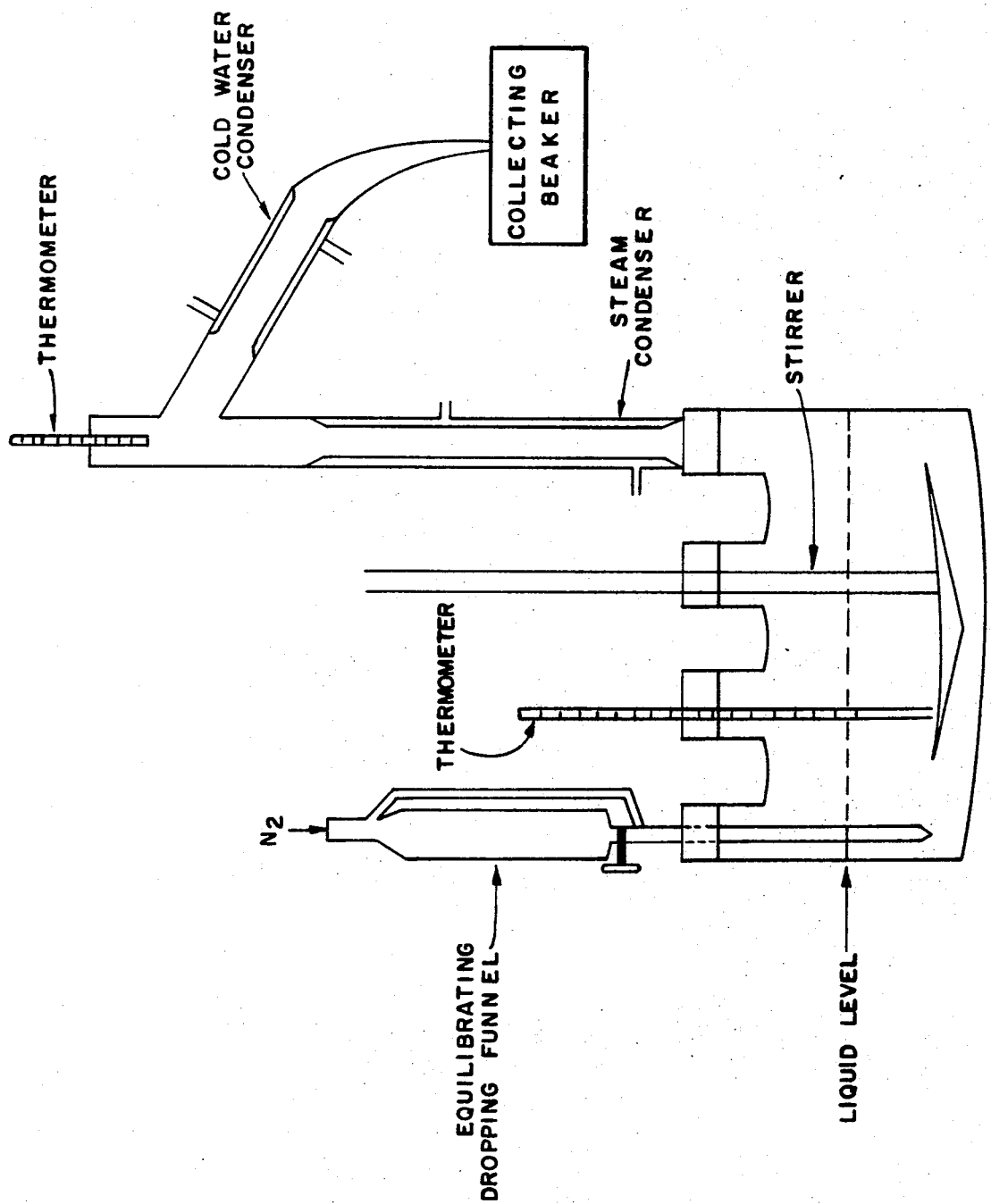

DIALKYLATED DIARYLAMINES AND A METHOD FOR PRODUCING SAME

The invention relates to a method of producing dialkylated diarylamines, in particular solid p,p' dioctylated diphenylamine, in such a manner as to (1) greatly increase the yield of the desired product and (2) eliminate the need for costly high pressure reaction equipment and to the resultant product.

More particularly the method comprises reacting (A) an olefin and (B) a diarylamine in the presence of a Friedel-Crafts catalyst under an inert atmosphere at ambient pressures at a temperature ranging from about 120°–140°C., said olefin being introduced below the surface of said diarylamine (B). This method affords a high yield and reduces undesirable by-products.

Dialkylated diarylamines have been widely used as antioxidants for rubber compounding and other systems subject to degradation for many years. They are very effective as antioxidants and yet preserve physical properties such as high tensile strength and low modulus.

However, when the alkyl side chain is short, for instance isopropyl, propyl or butyl, or when the diarylamine is diphenylamine, a problem arises. These short side chain diarylamines have a tendency to stain or bloom and are therefore not useful in light colored products. For these applications the higher alkylated, longer side chain, diarylamines, $C_5$ to $C_{10}$, are preferred. Blooming is reduced because of the increased compatibility of the antioxidant with the polymer structure of the rubber material. This increased alkyl character also accounts for the decreased staining properties of these antioxidants. It is desirable, therefore, to use as the alkylating agent $C_5$ to $C_{10}$ alcohols, halides and olefins. However the olefins are to be preferred for several reasons. Among these are low cost, ready availability and the fact that no water is produced as a by-product of the reaction. If water is formed as a by-product it must be removed at once or it will deactivate the catalyst. The removal of water is extremely difficult in this type of reaction making the olefins particularly attractive from this standpoint.

One of the difficulties involved in using a long chain alkylating agent is that an inverse relationship exists between alkylating reactivity and the length of the carbon chain. That is, when alkylating a diarylamine with a $C_5$ alkylating agent it is possible to use milder conditions than when running the same reaction using a $C_{10}$ alkylating agent. Reaction conditions have to be more severe with the longer chain alkylating agents. A method of preparation, widely known to the art, is by reacting an excess of olefin with diarylamine in the presence of an acid catalyst at elevated temperatures in a closed vessel. At the completion of the reaction the crude reaction mixture will contain, along with the desired dialkylated diarylamine product, a considerable quantity of undesirable olefin polymer, some monoalkylated diarylamine, some alkylating olefin and some unreacted diarylamine. The result of having olefin polymer and unreacted diarylamine in the mixture is a product which is a sticky, odorous liquid and which will not solidify.

Several methods have been employed in the art to remove these byproducts or to reduce them to a level as would allow for the solidification of the dialkylated diarylamine. Among these have been high temperature, high vacuum distillation of the crude reaction product, the addition of a scavenging agent to reduce undesirable products, (U.S. Pat. to Popoff, No. 2,943,112) a cumbersome method which finishes by cooling the dialkylated material in several steps to obtain the desired solid product (U.S. Pat. to Wolfe, No. 2,776,994), and recrystallizing from large quantities of methanol or alkylating olefin. The last method removes, along with the undesirable by-products, from 30 to 40 percent of the dialkylated compound which cannot be practically reclaimed from the solvent. Even when the solvent is removed a liquid remains which will not solidify. An additional method has been disclosed (see copending application by Bayha and Madden, Ser. No 4,521, filed Jan. 21, 1970) which teaches the use of an inert gas under high pressure to reduce unwanted by-products. This last process is effective but has the disadvantages that elaborate and costly pressure equipment is needed for the reaction along with the inherent danger of working at high pressures.

It is therefore an object of this invention to produce a dialkylated diarylamine antioxidant which is free from the aforementioned objectionable characteristics.

It is also an object of this invention to produce a dialkylated diarylamine antioxidant which is a hard and friable solid.

It is still further object of this invention to produce said solid antioxidant in such a manner as to make it ready for use after neutralization and removal of the catalyst and excess olefin, without further purification.

Another object of this invention is to produce said solid antioxidant without the use of any high pressure reaction equipment.

It has now been found that all of the aforementioned objects can be obtained by introducing the alkylating agent below the surface of the hot liquid diarylamine.

The addition of the alkylating agent in this manner gives surprising and unexpected advantages; namely: and exceptionally high yield of dialkylated product, such a small amount of by-products as to make purification unnecessary, and the capacity of running the reaction at lower temperatures.

A preferred method of producing dialkylated diarylamines in the light of the foregoing objects is as follows: The diarylamine and the catalyst are mixed together at a temperature ranging from about 100°C. to about 140°C. under an inert gas blanket and then the alkylating agent is introduced below the surface of the hot mixture with the aid of a positive nitrogen pressure. Initially the rate of volatilization of the alkylating agent is less than the rate of alkylation of the diarylamine. This continues until approximately half the theoretical amount of alkylating agent has been added. At this point the rate of volatilization exceeds the rate of alkylation of the diarylamine and the alkylating agent begins to distill out and is collected to be recycled. However, the rate of addition remains constant throughout and is such that it takes about three hours to complete, at which time the reaction conditions are maintained for an additional 30 minutes. The reaction mixture is then neutralized with caustic solution and excess alkylating agent is removed. Upon cooling the solid dialkylated diarylamine is suitable for use with no further purification steps necessary.

These objects and advantages as well as others will become more apparent to those skilled in the art from the following detailed description and examples.

As the alkylating agent there may be used $C_5$ to $C_{10}$ alkenes such as pentene-1, hexene-1, octene-1, heptene-1, nonene-1, decene-1, diisobutylene and their isomers etc. and mixtures thereof. In the preferred practice of this invention diisobutylene is used because outstanding results are achieved therefrom. Commercial diisobutylene is predominantly a mixture of two isomers, 2,4,4-trimethyl pentene-2 and 2,4,4-trimethyl pentene-1. Hence forth the word diisobutylene, when used throughout this specification, will mean the mixture of these isomers.

The diarylamines suitable for use in this invention to form solid antioxidants have the general formula:

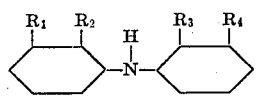

Wherein $R_1$, $R_2$, $R_3$ and $R_4$ are individually at least one member selected from the group consisting of hydrogen, naphthyl, halogen, and alkyl having from one to four carbon atoms, exemplified by o,o'-dimethyl diphenylamine, o,o'-m,m' tetra methyl diphenylamine, o,o'diethyl diphenylamine, o-chloro-diphenylamine, o,o'dichloro diphenylamine etc. In the preferred practice of this invention diphenylamine is used for economic reasons and particularly on account of optimum results obtained therefrom.

The reaction temperature may range from about 100°C. to about 140°C. but the preferred range is from about 120°C. to about 140°C. with 130°C. being particularly advantageous because of the superior results obtained therefrom.

The Friedel-Crafts catalyst is at least one member selected from the group consisting of aluminum chloride, boron trifluoride, boron trifluoride etherate, zinc chloride, phosphorous acid, phosphorus penta fluoride, stannic chloride, alkyl stannic chloride, vanadium chloride, and the like. In the preferred practice of this invention aluminum chloride is used, because of economy and superior performance.

The catalyst level may vary with the catalyst used from about 10 percent to about 15 percent based upon the weight of diarylamine. With aluminum chloride as the catalyst a ratio of about 12 percent based upon the weight of diphenylamine produces superior results.

An inert gas may be used to blanket the reaction and to act as a carrier for the addition of the diisobutylene, said gas being selected from the group consisting of nitrogen, carbon dioxide, helium, and the like and mixtures thereof.

In a typical example of this invention a clean dry four neck flask is flushed with dry nitrogen gas. The diphenylamine is added with stirring and the temperature is raised to 100°C., at which point the aluminum chloride is added. The temperature is then raised to about 130°C. and diisobutylene is introduced from an equilibrating dropping funnel which is extended to exit below the surface of the diphenylamine/catalyst mixture. A positive nitrogen pressure from the top of the funnel not only acts as a nitrogen sparge but carries the diisobutylene with it. After half of the theoretical amount of diisobutylene has been added some begins to distill over. This is collected with the aid of a steam condenser to be recycled. Soon after the addition of the diisobutylene, which takes about 3 hours, it stops distilling over and the reaction conditions are maintained for about 30 minutes. Then the mixture is allowed to cool to about 70°C. and the water is added. The aluminum chloride is neutralized with a 10% NaOH solution and then the mass is washed several times with water. At this point vacuum and heat are applied to remove any volatiles. The p,p'-dioctyl diphenylamine is then allowed to cool and solidify and is ready for use with no further purification steps required. The solid has a p,p' dioctyl diphenylamine content above 85 percent; a mono-octylated diphenylamine content ranging from about 5 percent to about 10 percent and a free diphenylamine content ranging from about 1 percent to about 2 percent. Yield is about 99 percent based upon the weight of diphenylamine used and has melting point of at least 75°C. Gel permeation chromatography shows that almost no polymer is present.

For optimum results it has been found that a ratio of about 3 to 4 moles of diisobutylene per 1 mole of diphenylamine is desirable. If a larger excess of diisobutylene is used polymer formation is greatly increased as well as other substituted diphenylamine products.

It has also been found that the addition time of the olefin can be as short as about 2 hours and as long as about 6 hours. However, the optimum time is about 3 hours, since outstanding results are achieved therewith.

Following are some examples offered as being typical and illustrative of this invention but by no means limiting it in its scope.

EXAMPLE I

To a reaction apparatus set up as illustrated below is charged three moles of diphenylamine under a nitrogen blanket. The temperature is raised to 100°C. with stirring and 60 grams of aluminum chloride and then added. The temperature is then raised to 130°C. and the diisobutylene, 12 moles, is added through the equilibrating dropping funnel exiting beneath the surface of the hot mixture by the aid of a positive nitrogen pressure, which also acts as a nitrogen sparge. The rate is adjusted so as to take 3 hours for the addition. At first no diisobutylene is distilled off but after approximately half of it has been added distillation begins. The nitrogen flow carries the distillate through the steam condenser into the cold water condenser wherein it liquifies and drains into a collection flask to be recycled. After the addition of the diisobutylene is complete the reaction conditions are maintained for an additional 30 minutes. Then the reaction mass is cooled to 70°C. and 50 ml. water is slowly added. After an initial exotherm the temperature is adjusted to about 80°C. to 90°C., and 1,000 ml. of a 10 percent solution of sodium hydroxide is added to neutralize the aluminum chloride. This is stirred for 1 hour and then the aqueous phase is separated and discarded. After repeating this procedure again, the reaction product is washed with 1,000 ml. of hot water containing 12 ml. concentrated HCl and then twice more with 1,000 ml. portions of hot water. A vacuum of 20 to 30 mm is applied whilst the temperature is raised from about 160°C. to about 170°C. to remove any volatiles. These conditions are maintained for approximately 1 to 2 hours and then the product is allowed to solidify. The final product has a melting point of 78°C. to 81°C. Analysis by GLC (Gas-Liquid Chromatograph. F & M Scientific Corp. Model 810) showed 85 percent was the di-product, 9.0 percent to be the mono-product and 1 percent free diphenylamine. The yield was 98 percent based upon the weight of the diphenylamine used.

EXAMPLE II

The procedure of Example I was followed exactly except that diisobutylene was replaced by heptene-1.

EXAMPLE III

The procedure of Example I was followed exactly except that diisobutylene was replaced by nonene-1.

EXAMPLE IV

The procedure of Example I was followed exactly except that the addition time was 2 hours.

EXAMPLE V

The procedure of Example I was followed exactly except that the addition time was 6 hours.

The invention will be more clearly understood by reference to the accompanying drawing which is referred to in Example I of this specification.

What is claimed is:

1. In a process for preparing a solid dialkylated diarylamine comprising reacting (A) an olefin having a carbon chain of from five to 10 atoms and (B) a diarylamine in the presence of a Friedel-Crafts catalyst at a temperature ranging from about 120°C. to about 140°C., under an inert gas atmosphere, and recovering said dialkylated diarylamine; the improvement wherein said olefin is introduced into the reaction mass below the surface of the reaction mass.

2. In a process for preparing a solid dialkylated diarylamine comprising reacting (A) an olefin having a carbon chain of from five to 10 atoms and (B) a diarylamine in the presence of a Friedel-Crafts catalyst at a temperature ranging from about 120°C. to about 140°C., under an inert gas atmosphere, and recovering said dialkylated diarylamine; the improvement wherein said olefin is introduced into the reaction mass below the surface of the reaction mass, over a period of time ranging from about 2 hours to about 6 hours.

3. In a process for preparing a solid dialkylated diarylamine according to claim 2 wherein the olefin is introduced over a period of 3 hours.

4. The process according to claim 2, wherein (A) is at least one member selected from the group consisting of hexene-1, pentene-1, heptene-1, octene-1, nonene-1, decene-1, and diisobutylene.

5. The process according to claim 4, wherein (A) is diisobutylene.

6. The process according to claim 2, wherein (B) is diphenylamine.

7. The process according to claim 2, wherein the Friedel-Crafts catalyst is at least one member selected from the group consisting of boron trifluoride, boron trifluoride etherate, aluminum chloride and phosphorous acid.

8. The process according to claim 7, wherein the Friedel-Crafts catalyst is aluminum chloride.

9. The process according to claim 7, wherein the catalyst level ranges from about 10 percent to about 15 percent based upon the weight of the diphenylamine used.

10. The process according to claim 8, wherein the catalyst level is 12 percent based upon the weight of the diphenylamine used.

11. The process according to claim 2, wherein the inert gas atmosphere consists of at least one member selected from the group consisting of nitrogen, carbon dioxide and helium.

12. The process according to claim 11, wherein the inert gas atmosphere consists of nitrogen.

13. The process according to claim 2, wherein the temperature is about 130°C.

* * * * *